US012763467B2

(12) United States Patent
Wei et al.

(10) Patent No.: US 12,763,467 B2
(45) Date of Patent: Oct. 13, 2026

(54) ELECTRONIC DEVICE AND ANTENNA STRUCTURE

(71) Applicant: WISTRON NEWEB CORPORATION, Hsinchu (TW)

(72) Inventors: Shih-Chiang Wei, Hsinchu (TW); Ying-Hsuan Chen, Hsinchu (TW); Hsieh-Chih Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 185 days.

(21) Appl. No.: 18/815,945

(22) Filed: Aug. 27, 2024

(65) Prior Publication Data

US 2025/0192433 A1 Jun. 12, 2025

(30) Foreign Application Priority Data

Dec. 12, 2023 (TW) ................................ 112148205

(51) Int. Cl.
*H01Q 5/371* (2015.01)
*H01Q 21/28* (2006.01)

(52) U.S. Cl.
CPC ............ *H01Q 5/371* (2015.01); *H01Q 21/28* (2013.01)

(58) Field of Classification Search
CPC ............................... H01Q 5/371; H01Q 21/28
See application file for complete search history.

(56) References Cited

U.S. PATENT DOCUMENTS

| | | | | |
|---|---|---|---|---|
| 10,454,156 B1 * | 10/2019 | Yang | ........................ | H01Q 1/48 |
| 11,563,275 B2 * | 1/2023 | Wei | ........................ | H01Q 5/328 |
| 2023/0291100 A1 * | 9/2023 | Lin | ........................ | H01Q 5/371 |

FOREIGN PATENT DOCUMENTS

| | | |
|---|---|---|
| TW | 201804673 A | 2/2018 |
| TW | 201814965 A | 4/2018 |
| TW | 202002403 A | 1/2020 |

* cited by examiner

*Primary Examiner* — Dimary S Lopez Cruz
*Assistant Examiner* — Austin M Back
(74) *Attorney, Agent, or Firm* — McClure, Qualey & Rodack, LLP

(57) ABSTRACT

An electronic device includes a metal housing and an antenna structure. The metal housing includes a first housing and a second housing. The antenna structure is disposed between the first housing and the second housing. The antenna structure includes a carrier, a radiating element, a grounding metal member, a first grounding extension structure, and a reactive element. A first metal portion of the grounding metal member is electrically connected to the first housing, and a second metal portion of the grounding metal member is electrically connected to the second housing. The first grounding extension structure is connected to the first metal portion and the second metal portion. The reactive element is electrically connected between the radiating element and the second metal portion.

18 Claims, 10 Drawing Sheets

ELECTRONIC DEVICE AND ANTENNA STRUCTURE

CROSS-REFERENCE TO RELATED PATENT APPLICATION

This application claims the benefit of priority to Taiwan Patent Application No. 112148205, filed on Dec. 12, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device and an antenna structure, and more particularly to an electronic device with a metal housing and a miniaturized antenna structure disposed inside the metal housing.

BACKGROUND OF THE DISCLOSURE

Since exterior designs of electronic products, such as laptop computers, are being designed toward being thinner and more lightweight, exterior casings of the electronic products are mostly made of a metal material. However, antenna modules within the electronic products can easily be negatively affected by the metal casings, thereby decreasing a communication quality of the electronic products. In order to avoid affecting the antenna characteristics, it is necessary to form slots in the metal casings to form a radiation clearance area. As a result, the electronic products are limited by the arrangement of the slots and may deviate from requirements in appearance and structural strength.

Therefore, how to overcome the above-mentioned problem through an improvement in structural design has become an important issue to be addressed in the related art.

SUMMARY OF THE DISCLOSURE

In response to the above-referenced technical inadequacies, the present disclosure provides an electronic device and an antenna structure to meet requirements on the appearance of the electronic device without affecting the antenna characteristics of the antenna inside the electronic device.

In order to solve the above-mentioned problems, one of the technical aspects adopted by the present disclosure is to provide an electronic device, which includes a metal housing and an antenna structure. The metal housing includes a first housing and a second housing. The antenna structure is disposed between the first housing and the second housing. The antenna structure includes a carrier, a radiating element, a grounding metal member, a first grounding extension structure, and a reactive element. The carrier has a first surface and a second surface that are opposite to each other, and a third surface and a fourth surface that are opposite to each other. The third surface and the fourth surface are located between the first surface and the second surface. The first surface faces outside the metal housing. The radiating element is disposed on the first surface. The radiating element is electrically connected to a feeding element. The grounding metal member is disposed on the second surface, the third surface, and the fourth surface. A part of the grounding metal member disposed on the third surface is defined as a first metal portion, and a part of the grounding metal member disposed on the fourth surface is defined as a second metal portion. The first metal portion is electrically connected to the first housing, and the second metal portion is electrically connected to the second housing. The first grounding extension structure is disposed on the first surface and connected to the first metal portion and the second metal portion. The reactive element is electrically connected between the radiating element and the second metal portion.

In order to solve the above-mentioned problems, another one of the technical aspects adopted by the present disclosure is to provide an antenna structure, which includes a carrier, a radiating element, a grounding metal member, a first grounding extension structure, and a reactive element. The carrier has a first surface and a second surface that are opposite to each other, and a third surface and a fourth surface that are opposite to each other. The third surface and the fourth surface are located between the first surface and the second surface. The first surface faces outside the metal housing. The radiating element is disposed on the first surface. The radiating element is electrically connected to a feeding element. The grounding metal member is disposed on the second surface, the third surface, and the fourth surface. A part of the grounding metal member disposed on the third surface is defined as a first metal portion, and a part of the grounding metal member disposed on the fourth surface is defined as a second metal portion. The first grounding extension structure is disposed on the first surface and connected to the first metal portion and the second metal portion. The reactive element is electrically connected between the radiating element and the second metal portion.

Therefore, in the electronic device and the antenna structure provided by the present disclosure, by virtue of the radiating element being disposed on the first surface that faces outside the metal housing, and the grounding metal member being disposed on the second surface, the third surface, and the fourth surface, and the grounding metal member being electrically connected to the metal housing, the antenna structure can be grounded through the metal housing. Accordingly, a miniaturized multi-band antenna structure can be formed in a limited space inside the electronic device, while maintaining good antenna characteristics.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
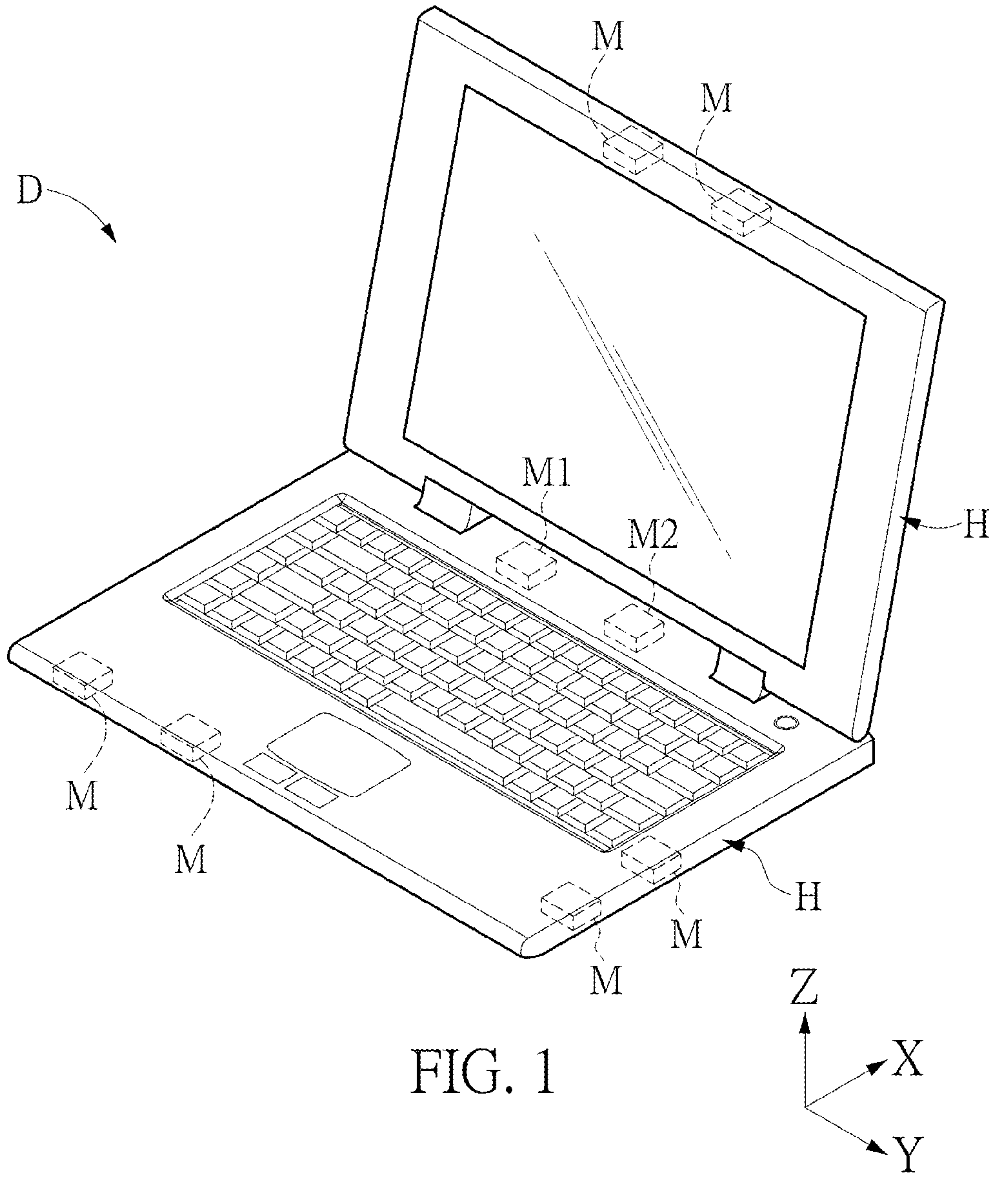
FIG. 1 is a schematic view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Referring to FIG. 1, FIG. 1 is a schematic view of an electronic device according to the present disclosure. The present disclosure provides an electronic device D. The electronic device D can be a smart phone, a tablet computer, or a laptop computer, but the present disclosure is not limited thereto. In the present disclosure, the electronic device D is exemplified as a laptop computer. As shown in FIG. 1, the electronic device D includes at least one antenna structure M, which can be distributed at different positions inside the electronic device D. In addition, in other embodiments, the electronic device D can include two adjacent antenna structures M. As shown in FIG. 1, for the convenience of further explaining the isolation between the two adjacent antenna structures M below, the two antenna structures M are respectively defined as an antenna structure M1 and an antenna structure M2.

Figure 2:
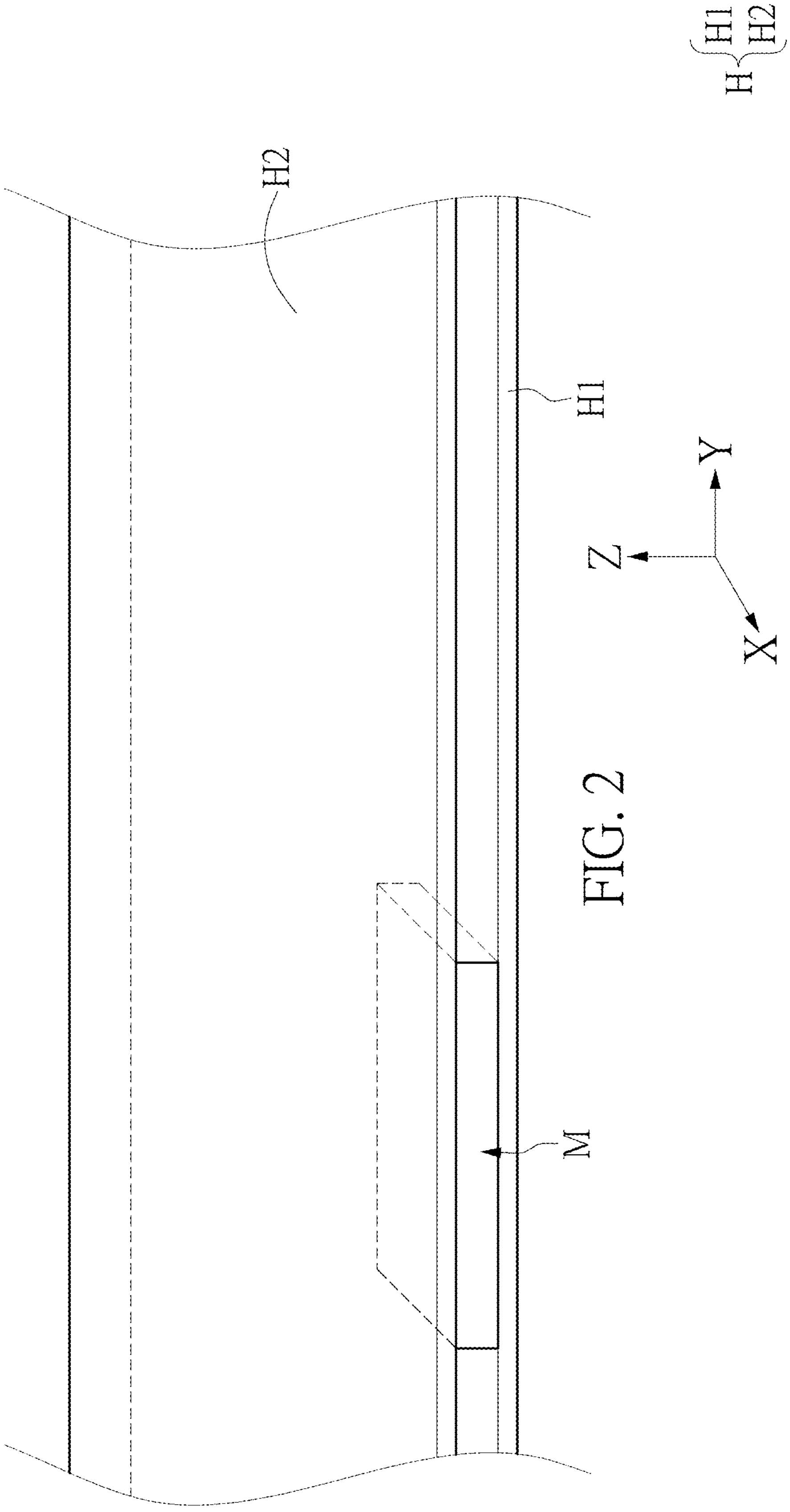
FIG. 2 is a schematic view of an antenna structure and a metal housing according to the present disclosure.

The following embodiments will provide exemplary descriptions of a single antenna structure. Referring to FIG. 2, FIG. 2 is a schematic view of an antenna structure and a metal housing according to the present disclosure. The electronic device D includes a metal housing H and an antenna structure M. The metal housing H includes a first housing H1 and a second housing H2. The antenna structure M is located at a position where the antenna structure M1 or M2 is located between the first housing H1 and the second housing H2. For example, the first housing H1 is a metal keyboard cover of the laptop computer (i.e., C part), and the second housing H2 is a metal bottom cover of the notebook computer (i.e., D part).

First Embodiment

Figure 3:
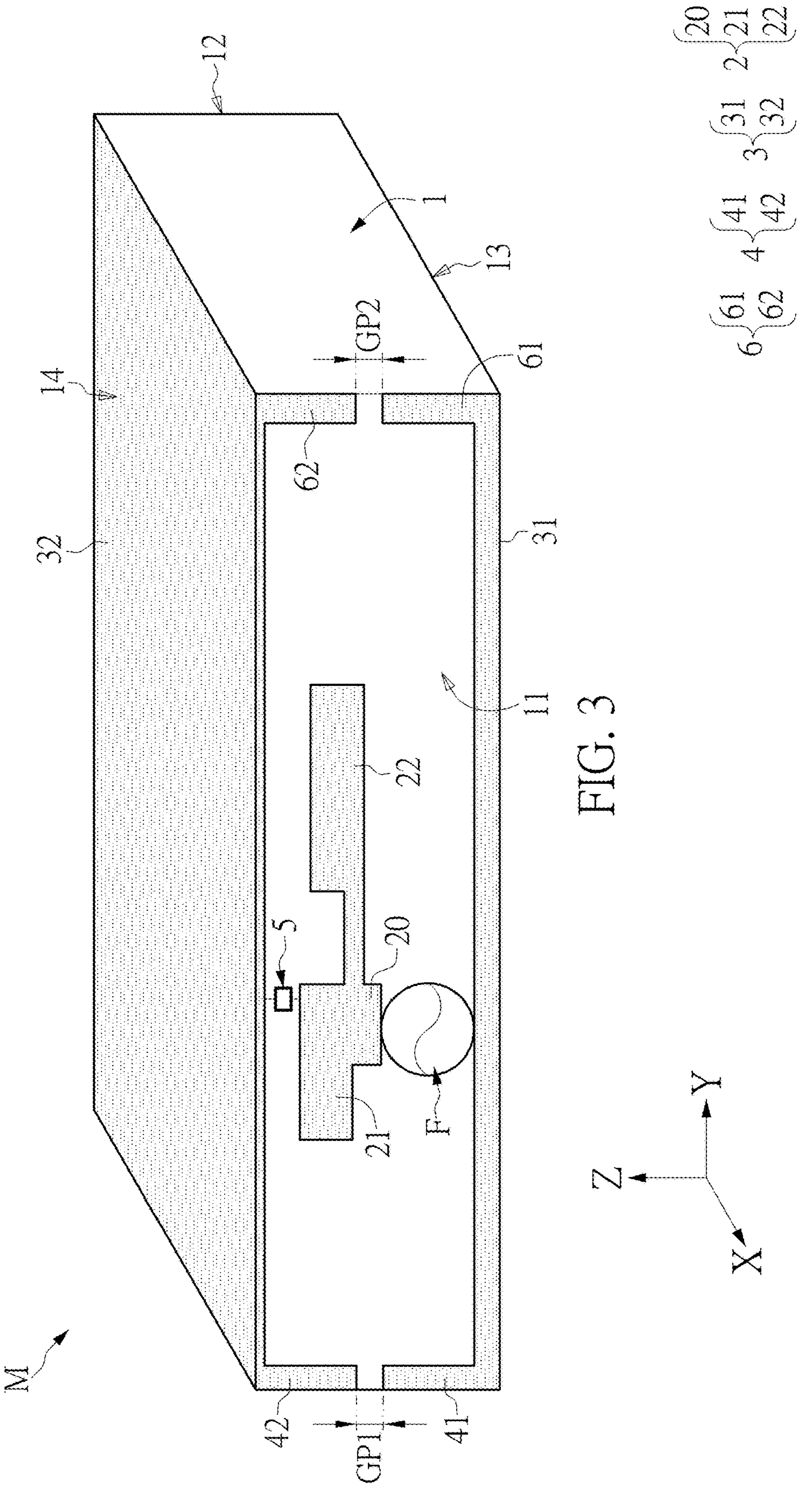
FIG. 3 is a schematic view of an antenna structure according to a first embodiment of the present disclosure.
Figure 4:
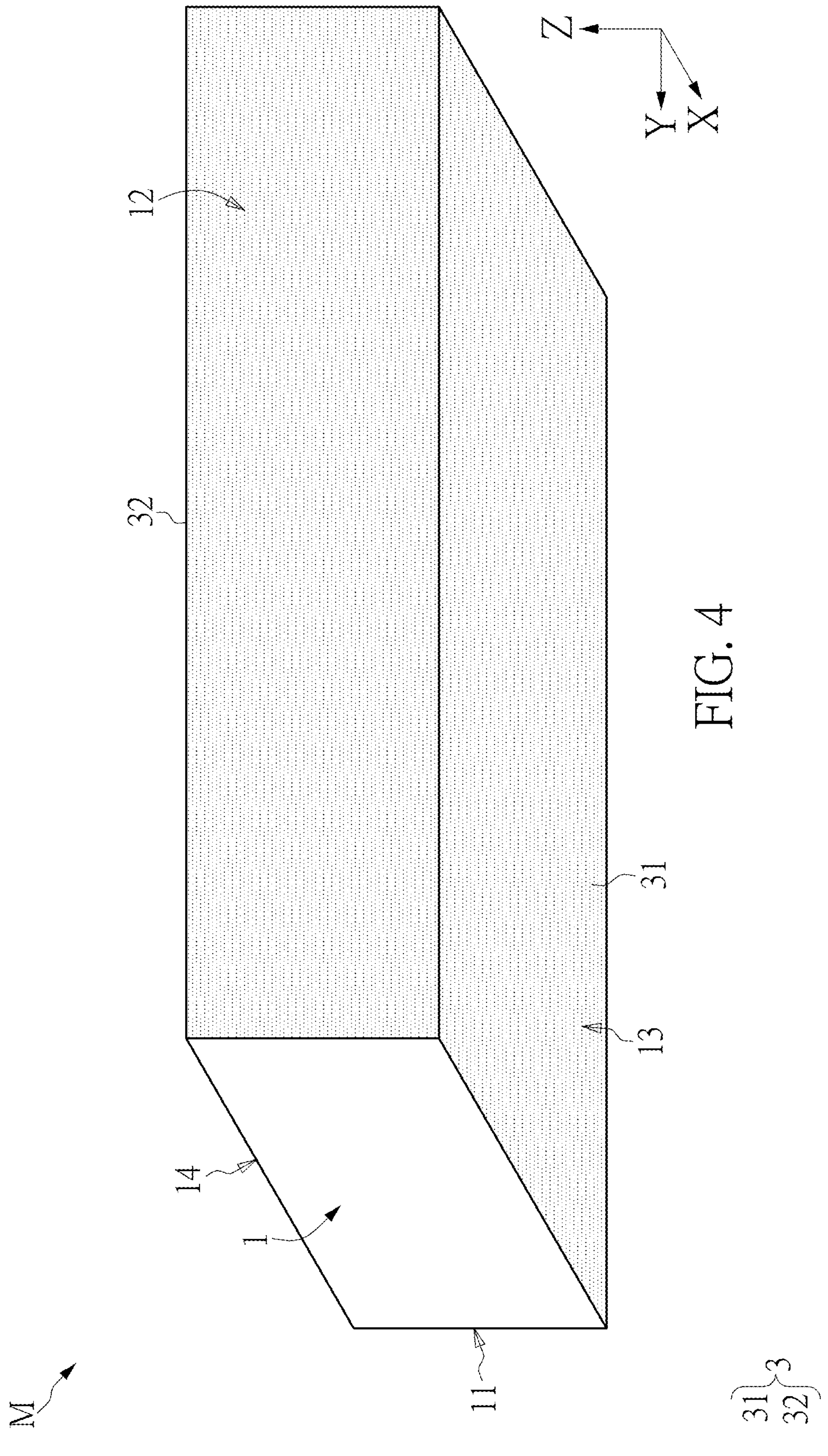
FIG. 4 is another schematic view of the antenna structure according to the first embodiment of the present disclosure.

Reference is made to FIG. 3 and FIG. 4, which are different schematic views of an antenna structure according to a first embodiment of the present disclosure. The antenna structure M includes a carrier 1, a radiating element 2, a grounding metal member 3, a first grounding extension structure 4, and a reactive element 5.

As shown in FIGS. 2 to 4, the carrier 1 has a first surface 11 and a second surface 12 that are opposite to each other, and a third surface 13 and a fourth surface 14 that are opposite to each other. The third surface 13 and the fourth surface 14 are located between the first surface 11 and the second surface 12. The first surface 11 faces outside the metal housing H. The radiating element 2 is disposed on the first surface 11 and electrically connected to a feeding element F. The antenna structure M can be fed into a signal to generate at least one operating frequency band through the feeding element F.

The grounding metal member 3 is disposed on the second surface 12, the third surface 13, and the fourth surface 14. The grounding metal member 3 includes a first metal portion 31 and a second metal portion 32. Specifically, a part of the grounding metal member 3 disposed on the third surface 13 is defined as the first metal portion 31, and a part of the grounding metal member 3 disposed on the fourth surface 14 is defined as the second metal portion 32. The first metal portion 31 is located between the third surface 13 and the first housing H1, and is electrically connected to the first housing H1. The second metal portion 32 is located between the fourth surface 14 and the second housing H2, and is electrically connected to the second housing H2. Moreover, the second surface 12, the third surface 13, and the fourth surface 14 of the carrier 1 is covered by the grounding metal member 3. The first metal portion 31 disposed on the third surface 13 is firmly in contact with the first housing H1, and the second metal portion 32 disposed in the fourth surface 14 is firmly in contact with the second housing H2.

Although upper and lower sides of the antenna structure M are covered by the first housing H1 and the second housing H2 respectively, the location (i.e., the first surface 11 of the carrier 1) of the radiating element 2 of the antenna structure M is not covered by the metal housing H. Therefore, the first surface 11 faces outside the metal housing H and forms a radiation clearance area.

For example, the feeding element F can be a coaxial cable. The carrier 1 can be a plastic member or a support member made of non-metal material. The radiating element 2, the grounding metal member 3, and the first grounding extension structure 4 can be metal sheets, metal wires or other conductors with conductive effects, and can be disposed on the carrier 1 through a printed circuit board, a flexible circuit board, or laser direct structuring.

In one aspect of the present disclosure, the carrier 1 is a plastic member, the grounding metal member 3 is formed on the second surface 12, the third surface 13, and the fourth surface 14 of the carrier 1 by laser direct structuring, and the radiating element 2 and the first grounding extension structure 4 are formed on the first surface 11 of the carrier 1 by laser direct structuring.

In another aspect of the present disclosure, the carrier 1 includes a dielectric substrate (i.e., the circuit board) and a non-metal support member. In this aspect, the second surface 12, the third surface 13, and the fourth surface 14 of the carrier 1 are all surfaces of the non-metal support member, and the first surface 11 of the carrier 1 is the surface of the dielectric substrate. Therefore, the grounding metal member 3 is disposed on the second surface 12, the third surface 13, and the fourth surface 14 (i.e., the surface of the non-metal support member). The radiating element 2 and the first grounding extension structure 4 are disposed on the first surface 11 (i.e., the surface of the dielectric substrate).

The antenna structure M of the present disclosure can be fixed and electrically connected to the metal housing H with a conductive buffer material. Alternatively, the antenna structure M can also be grounded by using conductive materials such as copper foil, conductive fabric, conductive sponge, or metal elastic sheets to be electrically connected to the metal housing H.

Figure 9:
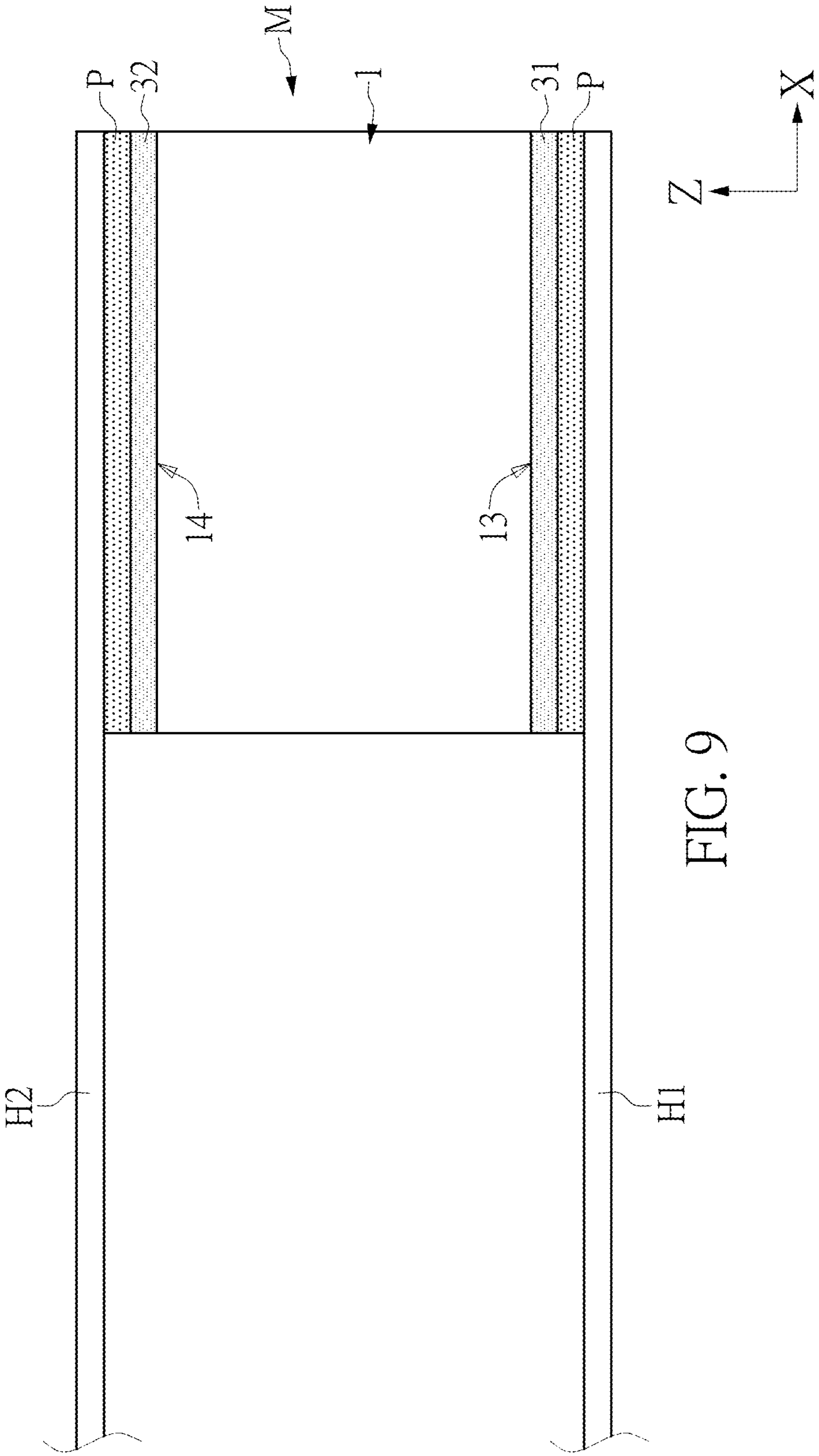
FIG. 9 is a schematic view of a first implementation of the antenna structure connecting the metal housing according to the present disclosure.

Referring to FIG. 9, FIG. 9 is a schematic view of a first implementation of the antenna structure connecting the metal housing according to the present disclosure. In order to further strengthen the grounding structure of the antenna structure M, a conductive buffer structure P can be provided between the first metal portion 31 and the first housing H1, and between the second metal portion 32 and the second housing H2, thereby increasing the electrical conduction between the grounding metal member 3 and the metal housing H. For example, the conductive buffer structure P can be a copper foil, a conductive fabric, a conductive sponge, a metal elastic sheet, or conductive glue, but the present disclosure is not limited thereto.

Figure 10:
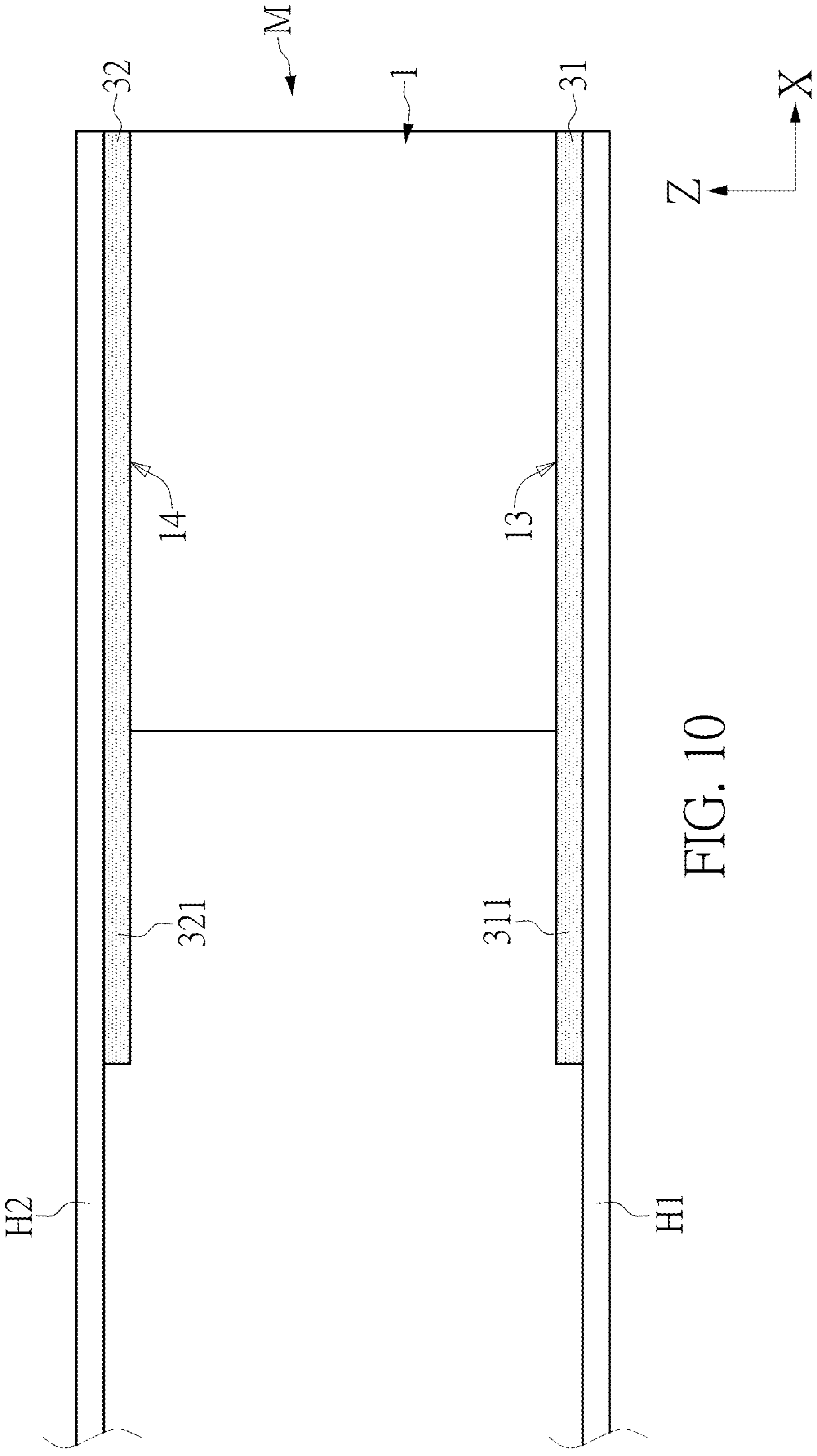
FIG. 10 is a schematic view of a second implementation of the antenna structure connecting the metal housing according to the present disclosure.

Referring to FIG. 10, FIG. 10 is a schematic view of a second implementation of the antenna structure connecting the metal housing according to the present disclosure. The antenna structure M further includes a first extending section 311 and a second extending section 321. The first extending section 311 and the second extending section 321 are electrically connected to the first metal portion 31 and the second metal portion 32, respectively. The first extending section 311 and the second extending section 321 are not disposed on the carrier 1. Furthermore, the first extension section 311 and the second extension section 321 are firmly in contact with and electrically connected to the first housing H1 and the second housing H2, respectively. Through the arrangement of the first extension section 311 and the second extension section 321, the grounding area of the first metal portion 31 and the second metal portion 3 can be increased. In addition, the first extension section 311 and the second extension section 321 can be further fixed on the metal housing H through fasteners, such as screws (not shown in the figures).

The reactive element 5 is electrically connected between the radiating element 2 and the second metal portion 32. The reactive element 5 can be an inductor and a capacitor, but the present disclosure is not limited thereto. In the first embodiment, the reactive element 5 is an inductor with an inductance value of 15 nH. Therefore, the radiating element 2 can be grounded through the reactive element 5 and the second metal portion 32 being electrically connected to the metal housing H.

The first grounding extension structure 4 is disposed on the first surface 11, and is connected to the first metal portion 31 and the second metal portion 32. A quantity of the grounding extension structure is not limited in the present disclosure. As shown in FIG. 4, the antenna structure M further includes a second grounding extension structure 6. The second grounding extension structure 6 is disposed on the first surface 11, and is connected to the first metal portion 31 and the second metal portion 32. The second grounding extension structure 6 can be formed in a similar manner as the radiating element 2 and the first grounding extension structure 4, and the similarities therebetween will not be reiterated herein. The first grounding extension structure 4 and the second grounding extension structure 6 are respectively located on both sides of the reactive element 2. In addition, a distance between at least one part of the radiating element 2 and the second metal portion 32 above the at least one part of the radiating element 2 is less than 5 mm, so as to control the coupling amount of the antenna structure M and affect the frequency offset of each frequency band generated by the antenna structure M.

The radiating element 2 can be a monopole antenna, which includes a feeding portion 20, a first radiating portion 21, and a second radiating portion 22 that are connected to each other. The feeding portion 20 is electrically connected to the feeding element F, and the first radiating portion 21 and the second radiating portion 22 respectively extend toward different directions. For example, the first radiating portion 21 and the second radiating portion 22 respectively extend toward both sides of the feeding portion 20. The first radiating portion 21 is adjacent to the first grounding extension structure 4, and the second radiating portion 22 is adjacent to the second grounding extension structure 6. The feeding portion 20 is fed into the signal by the feeding element F, such that the second radiating portion 22 is excited to generate an operating frequency band from 4.9 GHz to 5.5 GHz.

Reference is further made to FIG. 3. The first grounding extension structure 4 includes a first extending portion 41 and a second extending portion 42. The first extending portion 41 is connected to the first metal portion 31, and the second extending portion 42 is connected to the second metal portion 32. The first extending portion 41 and the second extending portion 42 have a first coupling gap GP1 therebetween. Similarly, the second grounding extension structure 6 includes a third extending portion 61 and a fourth extending portion 62. The third extending portion 61 is connected to the first metal portion 31, and the fourth extending portion 62 is connected to the second metal portion 32. The third extending portion 61 and the fourth extending portion 62 have a second coupling gap GP2 therebetween. Preferably, the first coupling gap GP1 and the second coupling gap GP2 are both less than 3 mm. Through the design of the first coupling gap GP1 and the second coupling gap GP2, the first extending portion 41 and the third extending portion 61 respectively generate capacitive coupling with the second extending portion 42 and the fourth extending portion 62.

The signal output by feeding element F is transmitted to the first extending portion 41 and the third extending portion 61 through the radiating element 2, the reactive element 5, and the grounding metal member 3. Therefore, the first extending portion 41 and the second extending portion 42 are coupled with each other to generate a low frequency mode, and the third extending portion 61 and the fourth extending portion 62 are coupled with each other to generate another low frequency mode, and the two low frequency modes jointly cover an operating frequency band from 2.4 GHz to 2.5 GHz.

It is worth mentioning that the first grounding extension structure 4 and the second grounding extension structure 6 do not need to be configured simultaneously. The configuration of the first grounding extension structure 4 and the second grounding extension structure 6 is determined based on a radiation space of the antenna structure M, that is, a radiation area on the first surface 11. When the antenna structure M has a large enough radiation area to generate enough radiation energy, only one of the first grounding extension structure 4 and the second grounding extension structure 6 needs to be selected and configured. However, when the radiation area of the antenna structure M is not large enough (such as the embodiment shown in FIG. 3), the radiation energy of the antenna structure M will cause the generated bandwidth to be insufficient to cover the low frequency range from 2.4 GHz to 2.5 GHz. As such, the first grounding extension structure 4 and the second grounding extension structure 6 need to be configured together to improve the radiation efficiency and enable the generated bandwidth to completely cover the low frequency range.

Furthermore, when the first grounding extension structure 4 and the second grounding extension structure 6 are close to each other (i.e., closer to the feeding element F), the frequency band generated by the first grounding extension structure 4 and the second grounding extension structure 6 will be shifted to a high frequency. When the first grounding extension structure 4 and the second grounding extension structure 6 are farther away from each other (that is, farther away from the feeding element F), the frequency band generated by the first grounding extension structure 4 and the second grounding extension structure 6 will be shifted to a low frequency. Furthermore, when the first coupling gap GP1 and the second coupling gap GP2 become larger, the frequency band generated by the first grounding extension structure 4 and the second grounding extension structure 6 will be shifted to a high frequency. When the first coupling gap GP1 and the second coupling gap GP2 become smaller, the frequency band generated by the first grounding extension structure 4 and the second grounding extension structure 6 will be shifted to a lower frequency.

Second Embodiment

Figure 5:
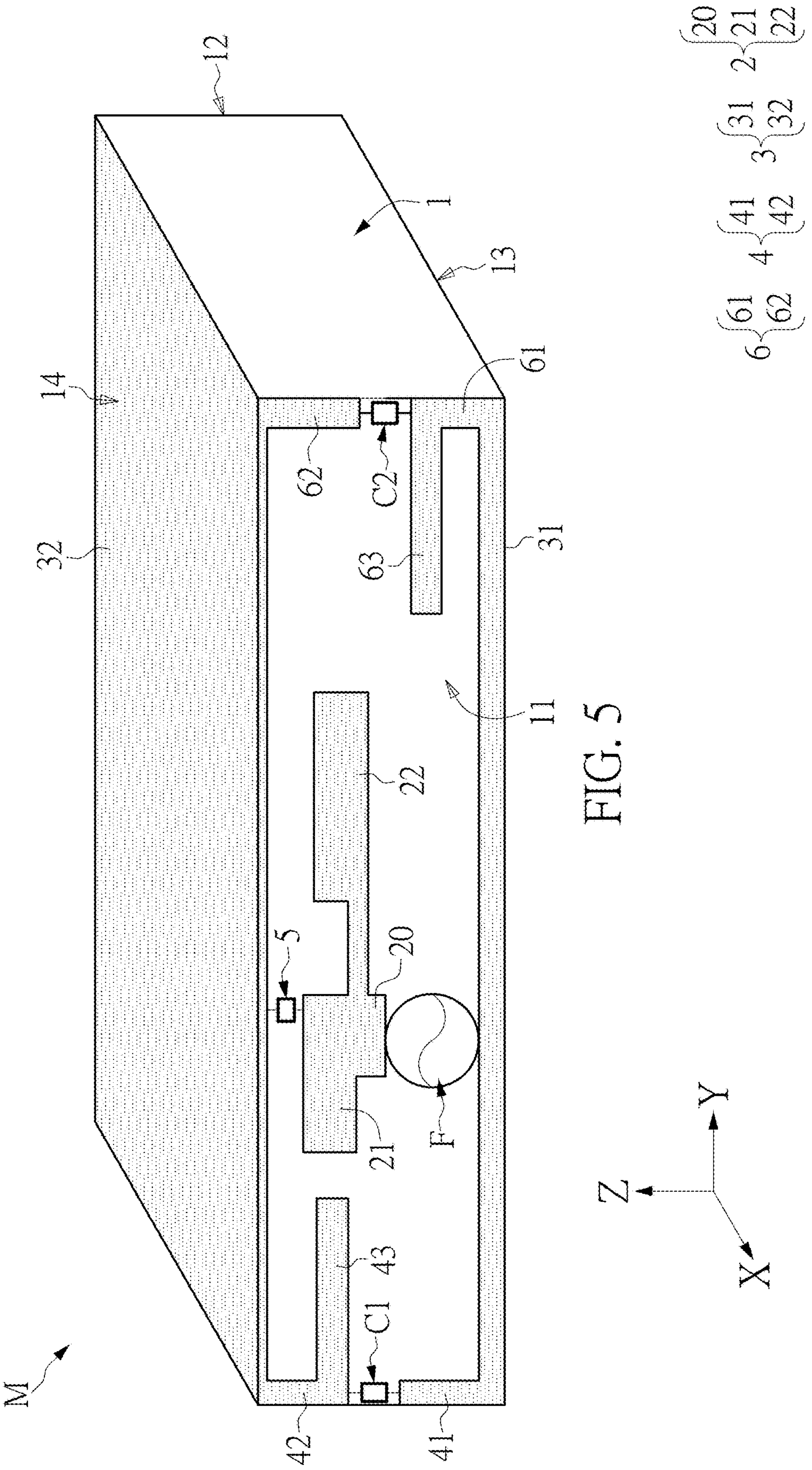
FIG. 5 is a schematic view of an antenna structure according to a second embodiment of the present disclosure.

Referring to FIG. 5, FIG. 5 is a schematic view of an antenna structure according to a second embodiment of the present disclosure. The antenna structure M of the second embodiment includes a carrier 1, a radiating element 2, a grounding metal member 3, a first grounding extension structure 4, a reactive element 5 (e.g., an inductor with an inductance value of 15 nH), and a second grounding extension structure 6. The antenna structure in the second embodiment has a structure similar to that of the antenna structure in the first embodiment, and the similarities will not be reiterated herein. The main difference between the second embodiment and the first embodiment is as follows: in the second embodiment, the first grounding extension structure 4 further includes a first capacitor C1 that is electrically connected between the first extending portion 41 and the second extending portion 42, and the second grounding extension structure 6 further includes a second capacitor C2 that is electrically connected between the third extending portion 61 and the fourth extending portion 62. Preferably, a capacitance value of the first capacitor C1 is 0.4 pF, and a capacitance value of the second capacitor C2 is 0.3 pF.

In other words, the first extending portion 41 and the second extending portion 42, and the third extending portion 61 and the fourth extending portion 62 are electrically connected through physical capacitors for energy transmission, such that the first grounding extension structure 4 and the second grounding extension structure 6 can generate an operating frequency band from 2.4 GHz to 2.5 GHz. It should also be noted that the size of the antenna structure M can be further reduced by adding the physical capacitors. For example, comparing FIG. 5 with FIG. 3, the size in the Y-axis direction of the antenna structure shown in FIG. 3 will be larger than that of the antenna structure in FIG. 5. Therefore, after adding the physical capacitors (the first capacitor C1 and the second capacitor C2), the size in the Y-axis direction of the antenna structure shown in FIG. 3 can be further reduced to be consistent with that in FIG. 5.

In the second embodiment, the first grounding extension structure 4 further includes a first branch 43, and the first branch 43 extends toward the first radiating portion 21. The first branch 43 and the first radiating portion 21 are coupled with each other to generate an operating frequency band from 5.5 GHz to 6E band. The 6E band refers to the WI-FI© 6E frequency band, which ranges between 5,925 MHz and 7,125 MHz. The second grounding extension structure 6 further includes a second branch 63, and the second branch 63 extends toward the second radiating portion 22. In addition, the first branch 43 and the second branch 63 can adjust the frequency offset of low frequency from 2.4 GHz to 2.5 GHz, and can also increase the amount of coupling with the grounding metal member 3 to further improve the matching of the 6E band. Moreover, the reactive element 5 can improve the matching and bandwidth of the high frequency from 5 GHz to 6 GHz.

Figure 6:
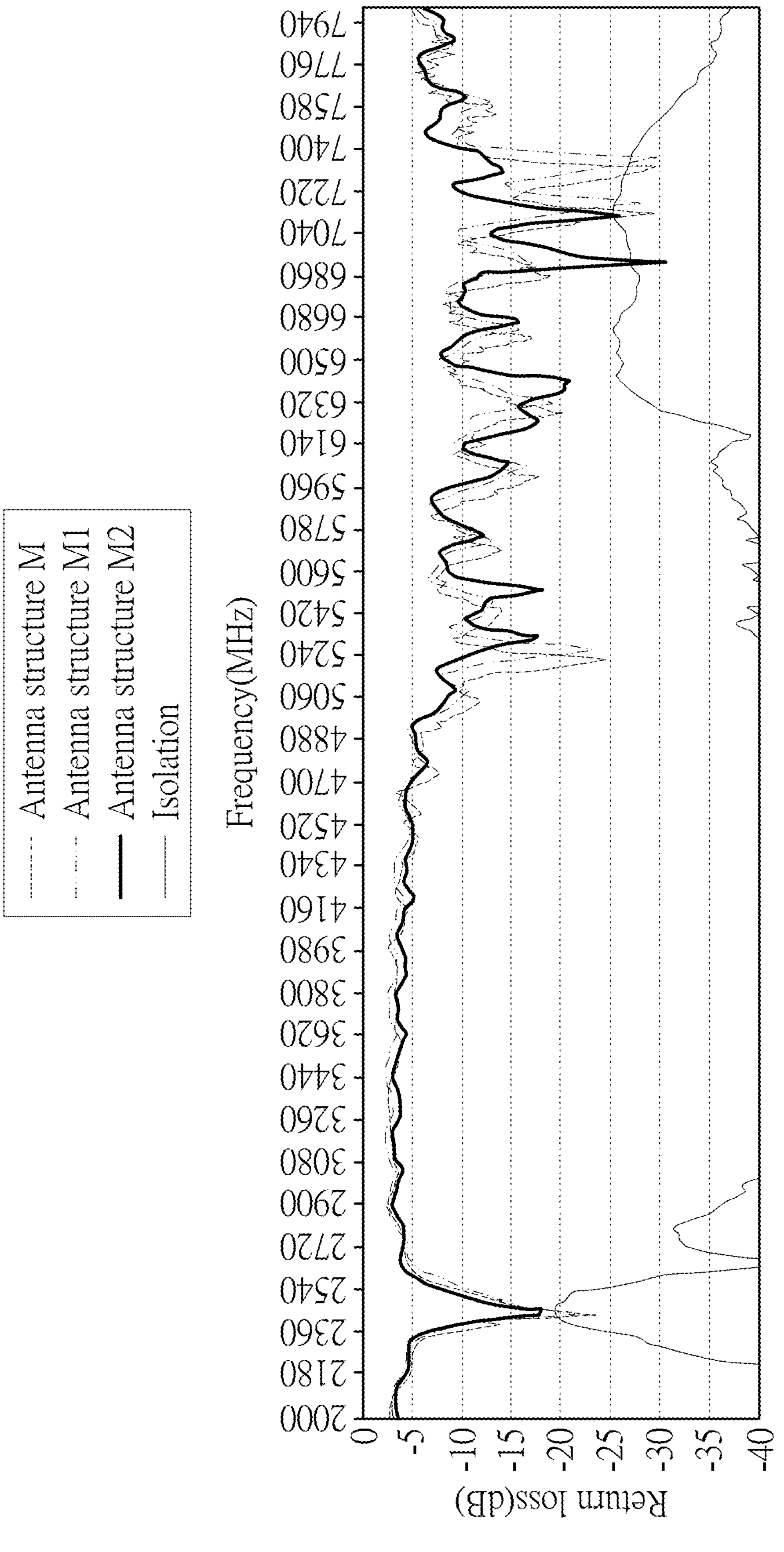
FIG. 6 is a schematic circuit diagram showing characteristics of the antenna structure according to the second embodiment of the present disclosure.

Referring to FIG. 6, FIG. 6 is a schematic circuit diagram showing characteristics of the antenna structure according to the second embodiment of the present disclosure. Specifically, FIG. 6 shows the return loss of the antenna structure M when only one antenna structure M is installed inside the electronic device, and FIG. 6 also shows the return loss of the two antenna structures M1 and M2 which are both represented by the antenna structure of the second embodiment, and the isolation between the two antennas when the two antenna structures M1 and M2 are installed inside the electronic device. As shown in FIG. 6, whether a single antenna structure or two antenna structures are installed inside the electronic device, it can exhibit good characteristics in the low frequency range from 2.4 GHz to 2.5 GHz and high frequency range from 4.9 GHz to 6E band. Moreover, when two antenna structures M1 and M2 are installed inside the electronic device, two antenna structures M1 and M2 can have good isolation therebetween to avoid mutual interference.

Third Embodiment

Figure 7:
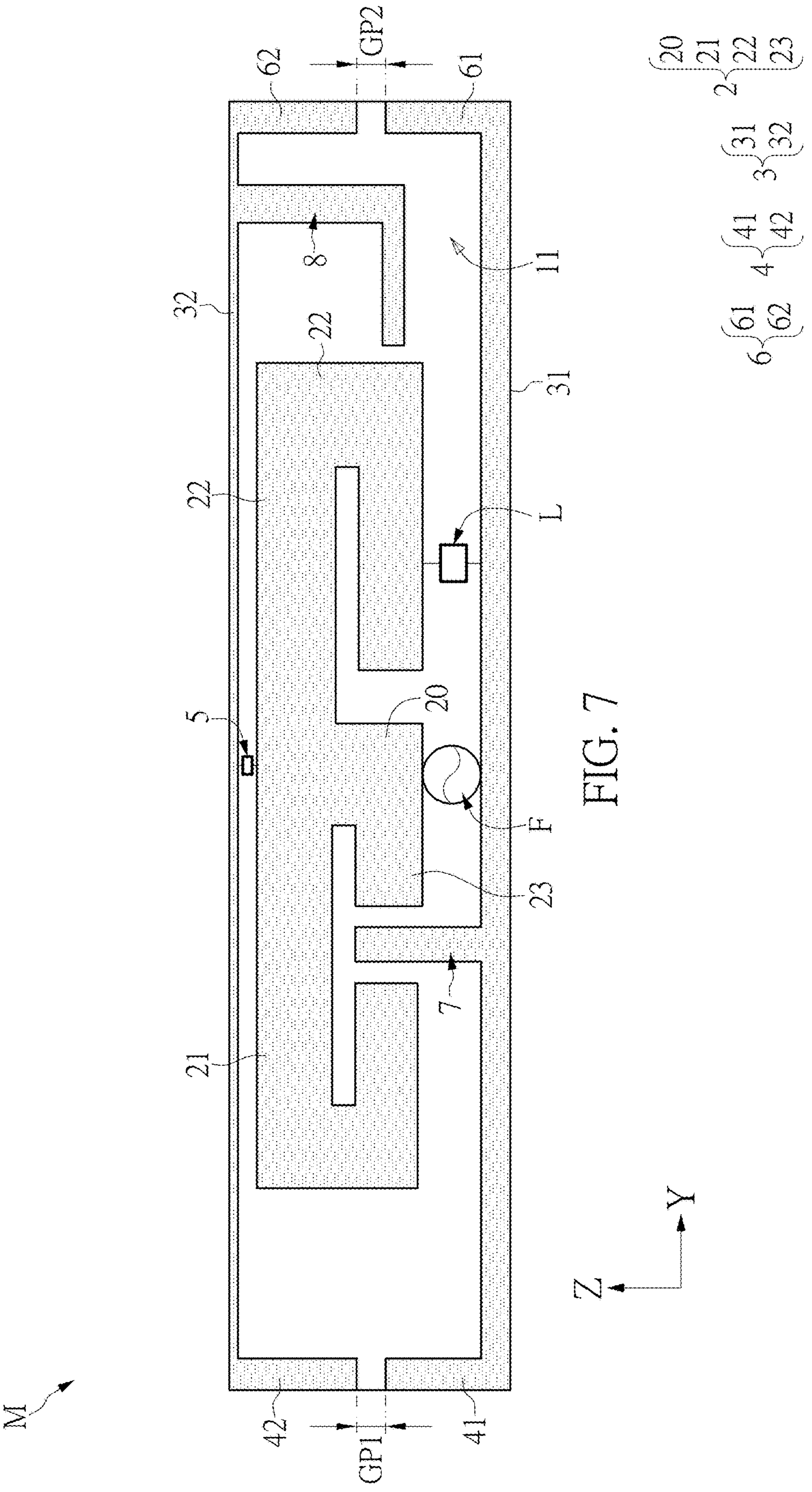
FIG. 7 is a schematic view of an antenna structure according to a third embodiment of the present disclosure.

Referring to FIG. 7, FIG. 7 is a schematic view of an antenna structure according to a third embodiment of the present disclosure. The antenna structure M of the third embodiment includes a carrier 1, a radiating element 2, a grounding metal member 3, a first grounding extension structure 4, a reactive element 5, and a second grounding extension structure 6. The antenna structure in the third embodiment has a structure similar to that of the antenna structure in the first embodiment, and the similarities will not be reiterated herein. It should be noted that FIG. 7 only shows the form of the antenna structure M on the first surface 11 of the carrier 1.

In the third embodiment, the first radiating portion 21 and the second radiating portion 22 of the radiating element 2 form a bent shape. The radiating element 2 further includes a third radiating portion 23, and the third radiating portion 23 is connected to the feeding portion 20. The antenna structure M further includes a first grounding radiation element 7 and a second grounding radiation element 8. The first grounding radiation element 7 is connected to the first metal portion 31 and located between the first radiating portion 21 and the third radiating portion 23. The second grounding radiation element 8 is connected to the second metal portion 32 and located between the second radiating portion 22 and the second grounding extension structure 6. In addition, the reactive element 5 is a capacitor with a capacitance value of 1 pF.

The first radiating portion 21 and the first grounding radiation element 7 are coupled with each other to generate an operating frequency band from 4.7 GHz to 5.4 GHz. The third radiating portion 23 and the first grounding radiation element 7 are coupled with each other to generate an operating frequency band from 5.5 GHz to 6E band. The antenna structure M further includes an inductor L that is electrically connected between the second radiating portion 22 and the first metal portion 31. The second grounding radiation element 8 and the second radiating portion 22 are coupled with each other, and are grounded through the inductor L to generate an operating frequency band of 6E band.

Fourth Embodiment

Figure 8:
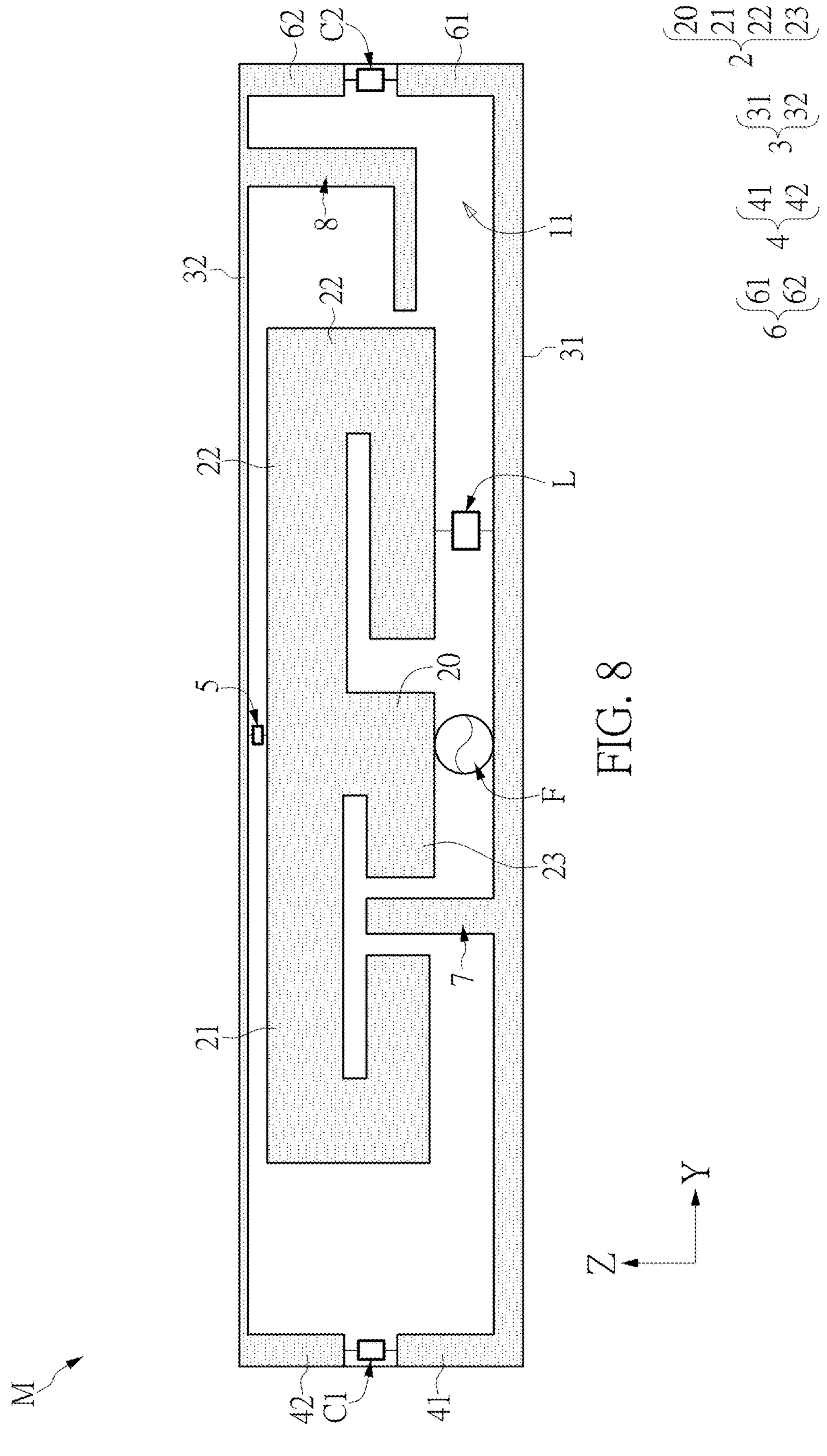
FIG. 8 is a schematic view of an antenna structure according to a fourth embodiment of the present disclosure.

Referring to FIG. 8, FIG. 8 is a schematic view of an antenna structure according to a fourth embodiment of the present disclosure. The antenna structure M of the fourth embodiment includes a carrier 1, a radiating element 2, a grounding metal member 3, a first grounding extension structure 4, a reactive element 5 (e.g., a capacitor with a capacitance value of 1 pF), a second grounding extension structure 6, a first grounding radiation element 7, a second grounding radiation element 8, and an inductor L. The antenna structure in the fourth embodiment has a structure similar to that of the antenna structure in the third embodiment, and the similarities will not be reiterated herein. The main difference between the fourth embodiment and the third embodiment is as follows: in the fourth embodiment, the first grounding extension structure 4 further includes a first capacitor C1 that is electrically connected between the first extending portion 41 and the second extending portion 42, and the second grounding extension structure 6 further includes a second capacitor C2 that is electrically connected between the third extending portion 61 and the fourth extending portion 62. Preferably, a capacitance value of the first capacitor C1 is 0.3 pF, and a capacitance value of the second capacitor C2 is 0.3 pF.

Comparing the fourth embodiment shown in FIG. 8 with the second embodiment shown in FIG. 5, the first capacitor C1 and the second capacitor C2 can be the same or different, and the present disclosure is not limited thereto. When the first capacitor C1 and the second capacitor C2 become larger, the frequency band generated by the grounding extension structure 4 and the second grounding extension structure 6 will be shifted to a low frequency. When the first capacitor C1 and the second capacitor C2 become smaller, the frequency band generated by the grounding extension structure 4 and the second grounding extension structure 6 will be shifted to a high frequency.

Beneficial Effects of the Embodiments

In the electronic device D and the antenna structure M provided by the present disclosure, by the grounding metal member 3 covering the second surface 12, the third surface 13 and the fourth surface 14 of the carrier 1, and being firmly in contact with and electrically connected to the first housing H1 and the second housing H, the antenna structure M and the environment (i.e., the metal housing H) jointly form a grounded structure. Moreover, through of the radiating element 2 arranged toward the outside of the metal housing H, the grounding reactive element, the first grounding extension structure 4, and the second grounding extension structure 6, the antenna structure can generate multiple frequency bands covering the low frequency and the high frequency. Accordingly, a miniaturized multi-band antenna structure can be formed in a limited space inside the electronic device, which can not only maintain good antenna characteristics, but meet the requirements of wideband antennas covering WI-FI® 6E and WI-FI® 7.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electronic device, comprising:

a metal housing including a first housing and a second housing; and an antenna structure disposed between the first housing and the second housing, wherein the antenna structure includes:

a carrier having a first surface and a second surface that are opposite to each other, and a third surface and a fourth surface that are opposite to each other, wherein the third surface and the fourth surface are located between the first surface and the second surface, and the first surface faces outside the metal housing;

a radiating element disposed on the first surface, wherein the radiating element is electrically connected to a feeding element;

a grounding metal member disposed on the second surface, the third surface, and the fourth surface, wherein a part of the grounding metal member disposed on the third surface is defined as a first metal portion, a part of the grounding metal member disposed on the fourth surface is defined as a second metal portion, the first metal portion is electrically connected to the first housing, and the second metal portion is electrically connected to the second housing;

a first grounding extension structure disposed on the first surface and connected to the first metal portion and the second metal portion, wherein the first grounding extension structure includes a first extending portion and a second extending portion, the first extending portion is connected to the first metal portion, the second extending portion is connected to the second metal portion, and the first extending portion and the second extending portion have a first coupling gap therebetween; and a reactive element electrically connected between the radiating element and the second metal portion.

2. The electronic device according to claim 1, wherein the antenna structure further includes a second grounding extension structure that is disposed on the first surface, the second grounding extension structure is connected to the first metal portion and the second metal portion, and the first grounding extension structure and the second grounding extension structure are located on both sides of the radiating element, respectively.

3. The electronic device according to claim 2, wherein the second grounding extension structure includes a third extending portion and a fourth extending portion, the third extending portion is connected to the first metal portion, the fourth extending portion is connected to the second metal portion, and the third extending portion and the fourth extending portion have a second coupling gap therebetween.

4. The electronic device according to claim 3, wherein the first grounding extension structure further includes a first capacitor, and the first capacitor is electrically connected between the first extending portion and the second extending portion; wherein the second grounding extension structure further includes a second capacitor, and the second capacitor is electrically connected between the third extending portion and the fourth extending portion.

5. The electronic device according to claim 2, wherein the radiating element includes a feeding portion, a first radiating portion, and a second radiating portion, the feeding portion is electrically connected to the feeding element, the first radiating portion and the second radiating portion respectively extend toward different directions, the first radiating portion is adjacent to the first grounding extension structure, and the second radiating portion is adjacent to the second grounding extension structure.

6. The electronic device according to claim 5, wherein the first grounding extension structure further includes a first branch, the first branch extends toward the first radiating portion, and the first branch and the first radiating portion are coupled with each other.

7. The electronic device according to claim 5, wherein the second grounding extension structure further includes a second branch, and the second branch extends toward the second radiating portion.

8. The electronic device according to claim 5, wherein the antenna structure further includes a first grounding radiation element that is connected to the first metal portion, the radiating element further includes a third radiating portion that is connected to the feeding portion, the first grounding radiation element is located between the first radiating portion and the third radiating portion, and the third radiating portion and the first grounding radiation element are coupled with each other.

9. The electronic device according to claim 5, wherein the antenna structure further includes a second grounding radiation element that is connected to the second metal portion, the second grounding radiation element is located between the second radiating portion and the second grounding extension structure, and the second grounding radiation element and the second radiating portion are coupled with each other.

10. The electronic device according to claim 9, wherein the antenna structure further includes an inductor that is electrically connected between the second radiating portion and the first metal portion.

11. The electronic device according to claim 1, wherein the antenna structure further includes a first extending section and a second extending section, the first extending section and the second extending section are not disposed on the carrier, the first extending section is electrically connected to the first housing and the first metal portion, and the second extending section is electrically connected to the second housing and the second metal portion.

12. An antenna structure disposed in a metal housing, comprising:

a carrier having a first surface and a second surface that are opposite to each other, and a third surface and a fourth surface that are opposite to each other, wherein the third surface and the fourth surface are located between the first surface and the second surface;

a radiating element disposed on the first surface, wherein the radiating element is electrically connected to a feeding element;

a grounding metal member electrically connected to the metal housing, wherein the grounding metal member is disposed on the second surface, the third surface, and the fourth surface, a part of the grounding metal member disposed on the third surface is defined as a first metal portion, and a part of the grounding metal member disposed on the fourth surface is defined as a second metal portion;

a first grounding extension structure disposed on the first surface and connected to the first metal portion and the second metal portion, wherein the first grounding extension structure includes a first extending portion and a second extending portion, the first extending portion is connected to the first metal portion, the second extending portion is connected to the second metal portion, and the first extending portion and the second extending portion have a first coupling gap therebetween; and a reactive element electrically connected between the radiating element and the second metal portion.

13. The antenna structure according to claim 12, further comprising a second grounding extension structure that is disposed on the first surface, wherein the second grounding extension structure is connected to the first metal portion and the second metal portion, and the first grounding extension structure and the second grounding extension structure are located on both sides of the radiating element, respectively.

14. The antenna structure according to claim 13, wherein the second grounding extension structure includes a third extending portion and a fourth extending portion, the third extending portion is connected to the first metal portion, the fourth extending portion is connected to the second metal portion, and the third extending portion and the fourth extending portion have a second coupling gap therebetween.

15. The antenna structure according to claim 14, wherein the first grounding extension structure further includes a first capacitor, and the first capacitor is electrically connected between the first extending portion and the second extending portion; wherein the second grounding extension structure further includes a second capacitor, and the second capacitor is electrically connected between the third extending portion and the fourth extending portion.

16. The antenna structure according to claim 13, wherein the radiating element includes a feeding portion, a first radiating portion, and a second radiating portion, the feeding portion is electrically connected to the feeding element, the first radiating portion and the second radiating portion respectively extend toward different directions, the first radiating portion is adjacent to the first grounding extension structure, and the second radiating portion is adjacent to the second grounding extension structure.

17. The antenna structure according to claim 16, wherein the first grounding extension structure further includes a first branch, the first branch extends toward the first radiating portion, and the first branch and the first radiating portion are coupled with each other.

18. The antenna structure according to claim 16, wherein the second grounding extension structure further includes a second branch, and the second branch extends toward the second radiating portion.

* * * * *